Patented June 11, 1940

2,203,770

UNITED STATES PATENT OFFICE 2,203,770

REFRACTORY AND METHOD OF MAKING IT

Raymond C. Benner and George J. Easter, Niagara Falls, N. Y., assignors to The Carborundum Company, Niagara Falls, N. Y., a corporation of Delaware No Drawing. Application October 25, 1937, Serial No. 170,849

8 Claims. (Cl. 106—9)

This invention relates to glass tanks and other furnaces where the upkeep of the lining is a problem due to corrosion from the molten contents, such as glass or corrosive liquid slags, or certain vapors of a corrosive nature. More particularly, this invention relates to refractories, and especially fused cast refractories, which we have found to be exceptionally resistant to corrosion when employed in the construction of glass furnaces or other furnaces and containers where like problems are encountered.

In the operation of glass tanks and certain other furnaces, the refractories are subjected to destructive conditions due both to the temperatures involved and to the corrosive contents. Many attempts have been made to find suitable materials for the construction of such furnaces. In an effort to secure better performance where the glass tank or furnace lining is subjected to such corrosive action, attempts have been made heretofore to use as a raw material for alumina refractories, alumina in which the amounts of other ingredients were kept at a minimum and therefore, only the purest of alumina ores or materials were so used in forming the refractories. Among other materials used for glass tank linings are clay blocks, and more recently, bonded and cast mullite blocks.

We have discovered that the attack upon the refractories by the corrosive contents of the glass tank or furnace is greatly retarded if the glass tank or furnace lining is made of castings of alumina to which has been added from 5 to 20% of iron oxide. This is particularly true when the content of silica and titania is kept below about 5%.

While there are sources of alumina in which iron oxides are naturally found, we find that they are not generally suitable for our purpose if they are simply fused and used as they occur. The proportions of the ingredients are seldom correct for our purposes. Moreover, wherever natural alumina ores containing sufficient amounts of iron are found, silica and/or titania is also present and must be removed from the bath by reduction or volatilization. In carrying out this removal much of the iron oxide is also removed as a consequence and it is necessary to add more iron oxide to the bath in controlled amounts. For that reason we prefer to add the iron oxide in definite measured amounts rather than depend upon its presence in the original alumina ore.

In the search for an ideal refractory for glass tank linings a number of things must be considered. Above all, the material, in addition to its ability to withstand high temperatures, must be highly resistant to attack by the molten glass or slags encountered in the glass tank and must not disintegrate too rapidly during use. Bonded refractories especially show a tendency to disintegrate due to the attacking of the bond by the slag, leaving the grains of more refractory material loose in the bath to form "stones." The material should furthermore after its installation show no alteration wherein the lining undergoes swelling and subsequent disintegration. Too rapid disintegration or attack of the refractory lining by the molten glass or slag, in addition to early failure of the lining, has several undesirable effects upon the glass product made under such conditions. Chief among these are the production of "seeds," "stones" and "cords" in the molten glass body, which interfere with the obtaining of a clean and uniform product from the glass tank as well as unduly prolonging the firing of the glass batch and cutting down production.

In addition to difficulties of this type, the corrosion of the refractory by the glass has in certain instances caused discoloration of the resultant product to such a degree as to interfere with its saleability. This has in general appeared to result particularly where the refractory has contained color-forming impurities such as chrome, manganese or iron. Particular efforts have therefore been made to prevent the presence of such colorizing oxides in the refractory, and to the best knowledge of the present inventors such precautions are essential in refractories of the ordinary bonded type which are intended for glass tank use.

It was with great surprise therefore that we discovered that in the case of cast refractories made of alumina and containing from 5 to 10% and even up to 20% of iron oxides, no discoloration of the glass resulted and that the resistance to corrosion was definitely better than with iron-free alumina castings.

We are unable to definitely explain the phenomenon underlying this radical departure from the expected behavior of iron in glass house refractories. It may be that the iron oxide is absorbed internally of the alumina crystals (a fact of which we have some petrographic evidence), and hence is not free to combine with the ingredients of the glass batch. The iron is apparently not only free to so combine, but so ties up the alumina also that the latter is much more stable against corrosion than when the iron is absent.

Microscopic examination of powder and of thin sections of our material indicates that it is inherently still crystalline alumina and not a material of the spinel type, and that the intercrystalline inclusions are neither more numerous, nor different in character from the inclusions in similar material to which iron is not added.

In endeavoring to explain the superiority of the iron-containing castings from a practical standpoint, it has also been postulated that the presence of the iron reduces the formation of carbides during the fusion, and so reduces the detrimental effect of these compounds in the resultant blocks. This may or may not be true, but in any event the result secured is strongly beneficial. It is incidentally desirable that the iron oxide be added in such quantities as to be substantially in excess of that required to react with any carbon in the melt.

In forming these cast refractory shapes for use in glass tanks and the like, in general we follow the procedure which is given in detail in the U. S. Patent No. 2,063,154. In the practice of the present invention it is necessary to take certain precautions or steps which are of particular importance in obtaining the above desired product. For example, care should be taken in the selection of impure alumina materials for the fusion that the presence of silica and titania is kept at a minimum as these materials must be otherwise reduced out of the bath by the addition of carbon or volatilized out by prolonged heating. It is preferred to choose materials comparatively free from silica and avoid this purifying stage. In adding the iron oxide it is found desirable to add the greater portion of the iron shortly before the casting is poured and after the major alumina portion of the bath has been brought to the molten state, and any undesired oxides removed. In this way the iron oxide is not reduced out by reaction with the carbon of the electrodes but remains in the molten mass as one of the final constituents. It is this retention of the iron oxide as one of the final constituents in substantial quantities which distinguishes the present cast material.

While it has usually been our practice to add our iron oxide in the form of $Fe_2O_3$, it is far from certain and in fact somewhat doubtful if it remains in this form in the finished product. Hence where in the present specification and claims iron oxide is specified it should be understood to mean any oxide of iron.

While we have mentioned the use of this material in cast form, it is also of value in the form of bonded refractories, which may be made in much the same way as bonded alumina refractories of the ordinary type. One method, given by way of example, is as follows:

In making bonded refractories of the above material the new mix is fused, as previously described; the pig is then crushed and ground to give grains of suitable sizes such, for instance, as 14 mesh and finer, which particles are then suitably bonded and fired at proper temperatures. For the bonding material 5 to 20% of the same material finely powdered may be used, or levigated $Al_2O_3$ to which 5 to 20% $Fe_2O_3$ has been added may be used. Burning temperatures from 1400 to 1600° C. are found to be satisfactory in firing the bodies. It is obvious that the crushed header material which is available from the casting of refractory pieces may be used for making bonded refractories.

Ordinary fireclay bonds may, of course, be used but the refractories produced are inferior in that they are not susceptible to use at the highest temperature ranges and are more susceptible to corrosive attack.

Although we have specifically referred to iron oxide as the additive compound, it is obvious that the addition of other compounds of iron is entirely within the spirit of the invention. Also, although these refractories are especially adapted for use in making glass tank linings, they may be used in lining other types of furnaces and for other applications where slag and corrosive conditions exist.

While we have explained in detail the manner of performing our invention, as illustrated by specific embodiments, it will be understood that our invention is not limited to the specific details of these embodiments, but may be otherwise embodied and practiced within the scope of the following claims.

We claim:

1. A glass tank comprising cast refractory blocks consisting principally of alumina and containing over 5% of iron oxide.

2. A furnace wall comprising refractory material consisting principally of alumina and containing over 5% of iron oxide.

3. A glass tank comprising cast refractory blocks consisting principally of alumina and containing from 5 to 10% iron oxide, and less than 5% of silica and titania.

4. A cast refractory article comprising at least 80% alumina and from 5% to 20% of iron oxide.

5. A refractory composition solidified from a molten mass, comprising 85 to 95% $Al_2O_3$ and 15-5% of iron oxide with less than 5% of silica and titania.

6. A refractory article consisting essentially of crystalline alumina, and containing approximately 5% of iron oxide, the later being absorbed internally of the alumina crystals.

7. A cast refractory article composed substantially of crystalline alumina, and iron oxide, the iron oxide constituting from 5 to 20% of the body and being principally absorbed within the alumina crystals.

8. In the process of making high alumina casting the steps which comprise forming a melt composed principally of alumina, adding 5–20% of iron oxide to the molten mass, and casting into molds to form castings.

RAYMOND C. BENNER.
GEORGE J. EASTER.